(12) United States Patent
Baek (10) Patent No.: US 10,724,383 B2
(45) Date of Patent: Jul. 28, 2020

(54) MODIFIED J TYPE CANTILEVERED VANE AND GAS TURBINE HAVING THE SAME

(71) Applicant: DOOSAN HEAVY INDUSTRIES & CONSTRUCTION CO., LTD., Changwon-si, Gyeongsangnam-do (KR)

(72) Inventor: Seol Baek, Yangju-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 49 days.

(21) Appl. No.: 16/135,169

(22) Filed: Sep. 19, 2018

(65) Prior Publication Data

US 2019/0128124 A1    May 2, 2019

(30) Foreign Application Priority Data

Oct. 27, 2017   (KR) .................. 10-2017-0141495

(51) Int. Cl.
   *F01D 9/04*   (2006.01)
   *F01D 5/18*   (2006.01)
   (Continued)

(52) U.S. Cl.
   CPC ............. *F01D 5/187* (2013.01); *F01D 5/141* (2013.01); *F01D 5/16* (2013.01); *F01D 5/3007* (2013.01);
   (Continued)

(58) Field of Classification Search
   CPC .......... F01D 5/141; F01D 5/16; F01D 5/3007; F01D 9/041; F01D 5/18; F01D 5/187
   See application file for complete search history.

(56) References Cited

U.S. PATENT DOCUMENTS 2,714,499 A * 8/1955 Warner .................. F01D 5/20
                                                      416/243
5,368,441 A * 11/1994 Sylvestro ............. F01D 5/187
                                                      416/90 A (Continued)

FOREIGN PATENT DOCUMENTS

JP    H02-140402 A    5/1990
JP    H10-508671 A    8/1998

(Continued)

OTHER PUBLICATIONS

A Korean Office Action dated Jan. 8, 2019 in connection with Korean Patent Application No. 10-2017-0141495 which corresponds to the above-referenced U.S. application.

*Primary Examiner* — J. Todd Newton
*Assistant Examiner* — Sabbir Hasan
(74) *Attorney, Agent, or Firm* — INVENSTONE Patent, LLC (57) ABSTRACT

A modified J-type cantilevered vane reduces rubbing of an airfoil and enhances the vibration stability of a vane hub and the fluidity of fluid. The cantilevered vane includes a root attachment inserted into a slot formed in an inner circumferential surface of a casing of a gas turbine, and an airfoil vertically extending from the root attachment to a predetermined height. The airfoil includes a linear part extending in a radial direction from the inner circumferential surface of the casing toward a rotating shaft of the gas turbine, and a curved part integrally formed with the linear part, the curved part including a bend beginning from one end of the linear part and curving in a circumferential direction of the rotating shaft. Overall, the linear part and the curved part are biased in the circumferential direction, since the airfoil has a J-shaped X-axis profile and a C-shaped Y-axis profile.

20 Claims, 9 Drawing Sheets

(51) Int. Cl.
  *F01D 5/16*  (2006.01)
  *F01D 5/30*  (2006.01)
  *F01D 5/14*  (2006.01)

(52) U.S. Cl.
  CPC ........ *F01D 9/041* (2013.01); *F05D 2240/122* (2013.01); *F05D 2240/125* (2013.01); *F05D 2250/71* (2013.01); *F05D 2250/75* (2013.01); *F05D 2260/201* (2013.01); *F05D 2260/2212* (2013.01)

(56) References Cited

U.S. PATENT DOCUMENTS

| | | | |
|---|---|---|---|
| 6,312,219 | B1 | 11/2001 | Wood et al. |
| 6,508,630 | B2 * | 1/2003 | Liu .......................... F01D 5/145 |
| | | | 416/228 |
| 7,806,653 | B2 | 10/2010 | Burton et al. |
| 9,011,084 | B2 | 4/2015 | Ono et al. |
| 9,828,864 | B2 * | 11/2017 | Whitehurst ............. F01D 5/303 |

FOREIGN PATENT DOCUMENTS

| | | |
|---|---|---|
| KR | 10-2014-0108406 A | 9/2014 |
| KR | 20140108406 A * | 9/2014 |

* cited by examiner

MODIFIED J TYPE CANTILEVERED VANE AND GAS TURBINE HAVING THE SAME

CROSS-REFERENCE TO RELATED APPLICATIONS

This application claims priority to Korean Patent Application No. 10-2017-0141495, filed on Oct. 27, 2017, the disclosure of which is incorporated herein by reference in its entirety.

BACKGROUND OF THE DISCLOSURE

Field of the Disclosure

Exemplary embodiments of the present disclosure relate to a cantilevered vane and a gas turbine having the cantilevered vane, and more particularly, to a modified J-type cantilevered vane capable of reducing rubbing of an airfoil and enhancing the vibration stability of a vane hub and the fluidity of fluid, and a gas turbine having the modified J-type cantilevered vane.

Description of the Related Art

A gas turbine is a power engine configured to mix fuel with air compressed by a combustor, combust the mixture, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws external air thereinto, compresses the air, and then transmits it to the combustor. Air compressed by the compressor enters a high-pressure and high-temperature state. The combustor mixes fuel with compressed air supplied from the compressor, and combusts the mixture. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

The operation principle of such a gas turbine includes drawing in the atmospheric air, compressing it using the compressor and transferring the compressed air to the combustor, generating high-temperature and high-pressure gas in the combustor, driving the turbine using the high-temperature and high-pressure gas, and then discharging exhaust gas to the atmosphere. In other words, the operation principle of the gas turbine may consist of four processes including a compression process, a heating process, an expansion process, and a heat rejection process.

Figure 1:
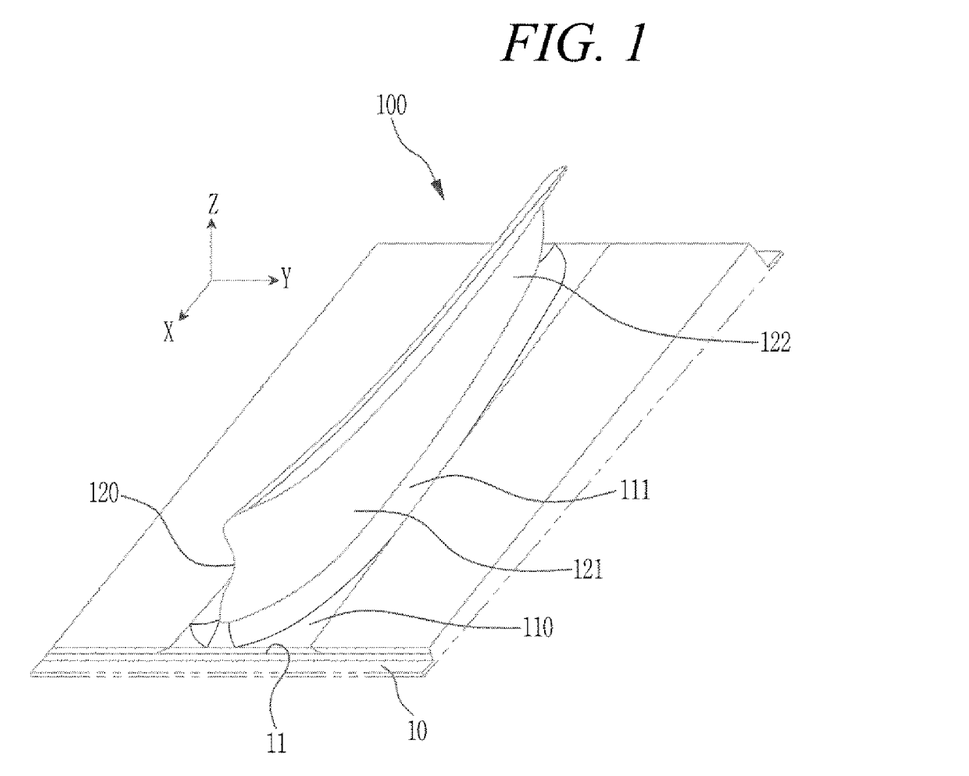
FIGS. 1 and 2 are perspective views of a cantilevered vane in accordance with an embodiment of the present disclosure.
Figure 2:
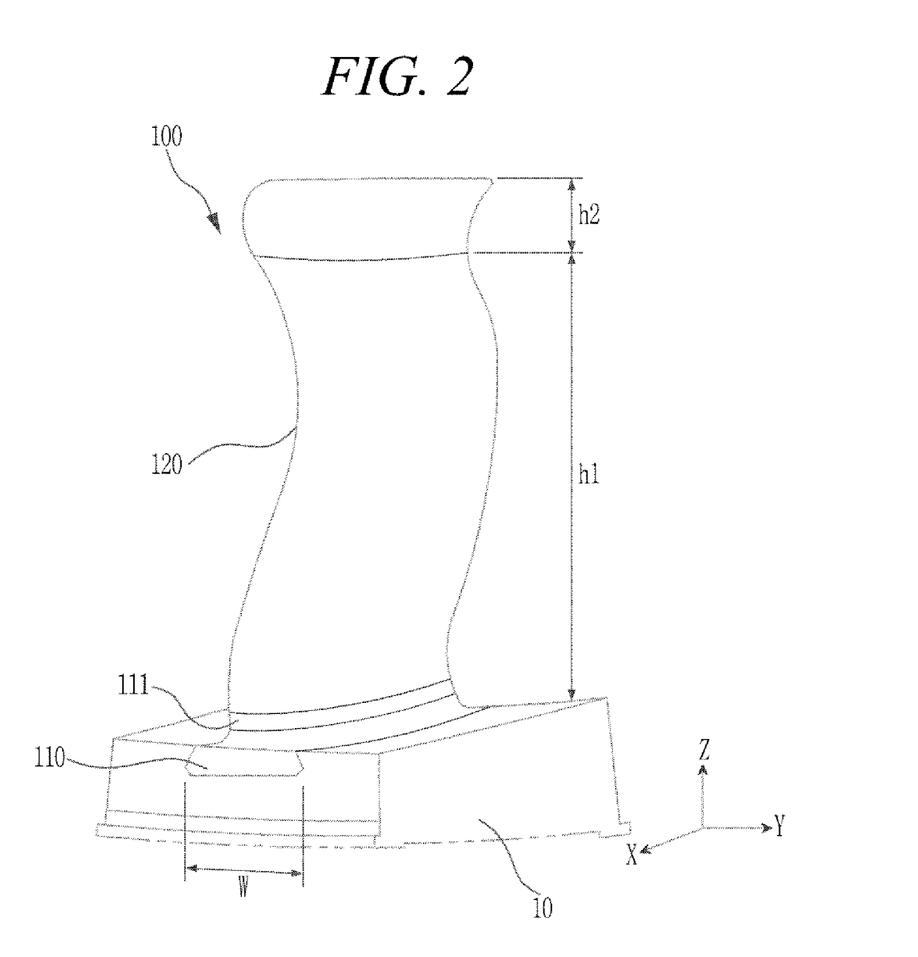

FIGS. 1 and 2 show a turbine blade among major components of the typical gas turbine having the above-described configuration and operation principle. Conventionally, such a turbine blade has employed a C-shaped, bowed vane in which a vane hub and a tip have the same acute angle.

In the case of the C-shaped bowed vane according to the conventional art, the low-level natural frequency is reduced, whereby there is a risk of flutter.

Therefore, a technique pertaining to a gas turbine blade assembly capable of solving the foregoing problem of the conventional art is needed.

SUMMARY OF THE DISCLOSURE

An object of the present disclosure is to provide a modified J-type cantilevered vane capable of reducing rubbing of an airfoil and enhancing the vibration stability of a vane hub and the fluidity of fluid, and a gas turbine having the modified J-type cantilevered vane.

In accordance with one aspect of the present disclosure, a cantilevered vane may include a root attachment configured to be inserted into a slot formed in an inner circumferential surface of a casing of a gas turbine; and an airfoil vertically extending from the root attachment to a predetermined height, the airfoil including a linear part extending in a radial direction from the inner circumferential surface of the casing toward a rotating shaft of the gas turbine, and a curved part integrally formed with the linear part, the curved part including a bend beginning from one end of the linear part and curving in a circumferential direction of the rotating shaft, wherein the linear part and the curved part are biased in the circumferential direction.

The cantilevered vane may further include a rounded structure formed at a junction between the root attachment and the airfoil.

The rounded structure may have a curvature radius corresponding to a length ranging from 10% to 35% of a width of the root attachment.

The linear part may have a first vertical height with respect to the casing, and the curved part may have a second vertical height with respect to the first vertical height, the second vertical height corresponding to a length ranging from 20% to 30% of the first vertical height.

The linear part may include a first passage through which cooling fluid flows, and the curved part may include a second passage through which cooling fluid flows.

The airfoil may include a front airfoil part and a rear airfoil part. The first passage may include a front airfoil passage for guiding a flow of cooling fluid toward the front airfoil part, a rear airfoil passage for guiding a flow of cooling fluid toward the rear airfoil part, and a discharge connection passage communicating with the front airfoil passage, the discharge connection passage configured to discharge cooling fluid through the second passage and the rear airfoil passage.

The second passage may include a plurality of cooling passages extending toward a rear airfoil direction of the airfoil. The first passage and the second passage may communicate with each other via at least two discharge connection holes through which cooling fluid in the first passage flows to the second passage. The at least two discharge connection holes may have inner diameters that gradually increase along a flow direction of cooling fluid.

The cantilevered vane may further include a channel partition for forming the front and rear airfoil passages and for guiding cooling fluid drawn from a lower end of each of the front airfoil passage and the rear airfoil passage to move the respectively drawn cooling fluid in a series of opposing directions. The channel partition may have at least two cooling holes positioned toward each of the front airfoil part and the rear airfoil part.

The airfoil may have a trailing edge in which at least two discharge holes are formed to communicate with the second passage and to discharge cooling fluid that flows in the second passage toward the trailing edge. The airfoil may include a front airfoil part and a rear airfoil part, and the at least two discharge holes have inner diameters that gradually increase toward the rear airfoil part.

The cantilevered vane may further include a plurality of protrusion structures formed in the rear airfoil passage, each protrusion structure protruding a predetermined height to create turbulence in the flow of cooling fluid in the rear airfoil passage.

The airfoil may have a J-shaped profile with respect to an axial direction of the rotating shaft and may have a C-shaped profile with respect to the circumferential direction.

In accordance with another aspect of the present disclosure, there is provided a gas turbine including a plurality of cantilevered vanes spaced apart from each other on an inner circumferential surface of a casing. Each cantilevered vane of the gas turbine is consistent with the above-described cantilevered vane.

A cantilevered vane in accordance with an embodiment of the present disclosure has a J-shaped profile with respect to the X-axis, thus having effects of reducing rubbing of the airfoil and enhancing the vibration stability of a vane hub.

In addition, the cantilevered vane has a C-shaped profile with respect to the Y-axis, thus having an effect of enhancing the fluidity of fluid flowing around the vane.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Throughout the present disclosure, as shown in the drawings, the X-axis refers to an axial direction of a rotating shaft to which a compressor disk or a turbine disk is coupled, the Y-axis refers to a circumferential or tangential direction based on the X-axis, and the Z-axis refers to a radial direction in which the cantilevered vane is mounted. Specifically, the Z-axis corresponds to a direction from an inner circumferential surface of a casing of the gas turbine toward the rotating shaft.

Figure 3:
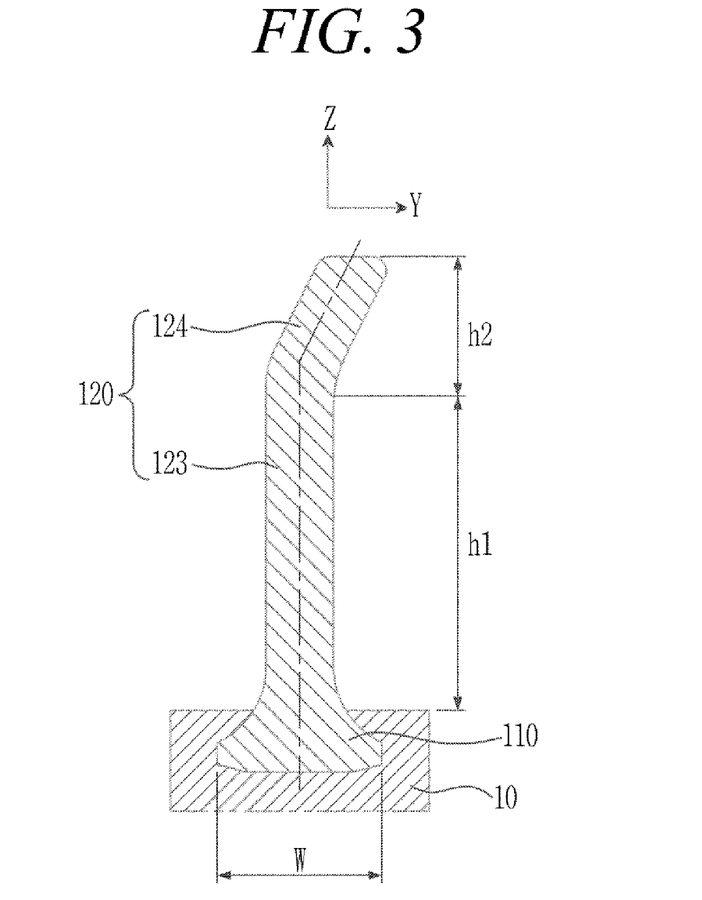
FIGS. 3 and 4 are diagrams of the cantilevered vane of the present disclosure viewed in the axial (X-axis) and tangential (Y-axis) directions, respectively.
Figure 4:
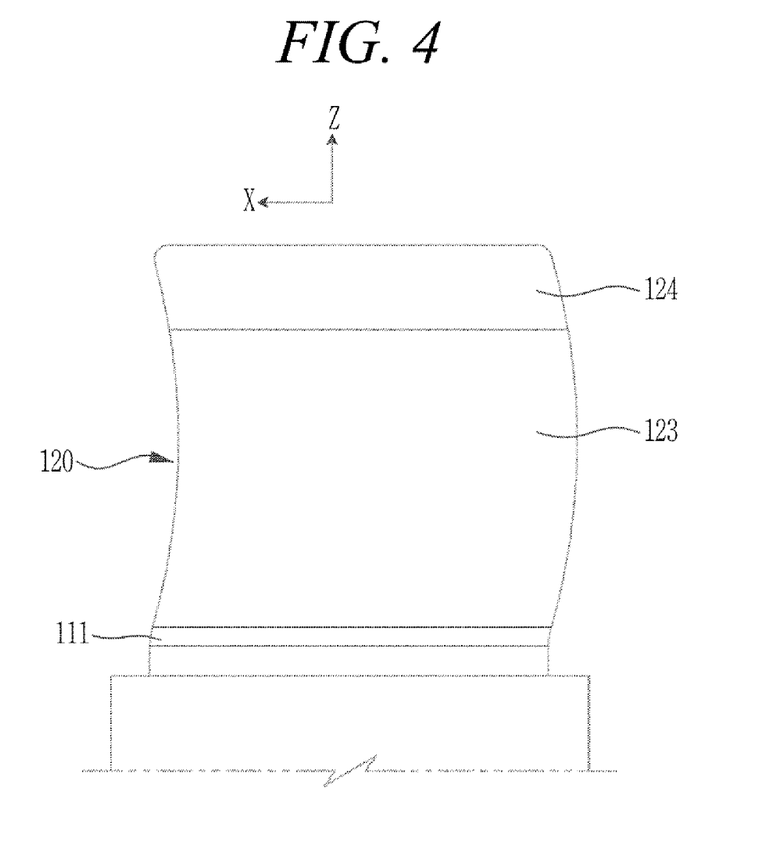

FIGS. 1 and 2 illustrate a cantilevered vane 100 in accordance with an embodiment of the present disclosure. FIGS. 3 and 4 respectively show the cantilevered vane viewed in the axial (X-axis) and tangential (Y-axis) directions.

The cantilevered vane 100 may be a vane which is mounted to a compressor, or a vane which is mounted to a turbine. In the case where the cantilevered vane 100 is mounted to the turbine, the cantilevered vane 100 may further include a cooling passage for cooling the turbine blade.

In accordance with an embodiment of the present disclosure, each of a plurality of cantilevered vanes 100 is installed in a dovetail slot 11 formed in the inner circumferential surface of a casing 10. The cantilevered vanes 100 are arranged along the circumferential direction (Y-axis) so as to be spaced apart from each other by a predetermined distance. Each cantilevered vane 100 includes a root attachment 110 inserted into the dovetail slot 11, and an airfoil 120 extending from the root attachment 110 to a predetermined height. The casing may be a compressor casing or a turbine casing.

In the cantilevered vane 100 in accordance with an embodiment of the present disclosure, a shroud structure may be omitted. Furthermore, the airfoil 120 forming the cantilevered vane 100 may include a front airfoil part 121 and a rear airfoil part 122. The airfoil 120 portion of the cantilevered vane 100 may have a J-shaped profile when viewed in the X-axis direction as in FIG. 3, and a C-shaped profile when viewed in the Y-axis direction as in FIG. 4.

The cantilevered vane 100 in accordance with an embodiment of the present disclosure having the above-described configuration may reduce rubbing of the airfoil 120 and enhance the vibration stability of a vane hub and the fluidity of fluid.

Referring to FIG. 2, a rounded structure 111 having a predetermined curvature radius may be formed at the junction between the root attachment 110 and the airfoil 120 of the cantilevered vane 100. In this case, the curvature radius of the rounded structure 111 is not limited to a specific value of length, so long as the length enables the rounded structure 111 to stably support the airfoil 120 on the root attachment 110. It is preferable that the curvature radius (R) of the rounded structure 111 be a length corresponding to 10% to 35% of a width (W) of the root attachment 110. The curvature radius (R) of the rounded structure 111 may vary according to environment of use or intention of a designer.

The airfoil 120 may include a linear part 123 and a curved part 124, which together form the J-shape of the profile of the airfoil 120 as shown in FIG. 3. The general C-shape of the profile of the airfoil 120 is evident along the opposite edges (leading and trailing) of the linear part 123 and the curved part 124 of the airfoil 120 as shown in FIG. 4.

As shown in FIGS. 2 and 3, the linear part 123 of the airfoil 120 may vertically extend upward from the root attachment 120 to a first predetermined height. The curved part 124 of the airfoil 120 may be integrally formed with the linear part 123 and may extend, in the Y-axis direction, from an upper end of the linear part 123 to form a curve including a predetermined angle. Thus, the curved part 124 of the airfoil 120 may extend from the upper end of the linear part 123 by a second predetermined height, in addition to the first predetermined height. Here, the linear part 123 may have a vertical height h1 with respect to the surface of the casing 10, and the curved part 124 may have a vertical height h2 with respect to the vertical height h1.

Here, the vertical height h2 of the curved part 124 may be appropriately changed according to environment of use or intention of a designer, and preferably, may correspond to a length ranging from 20% to 30% of a vertical height h1 of the linear part 123.

Figure 5A:
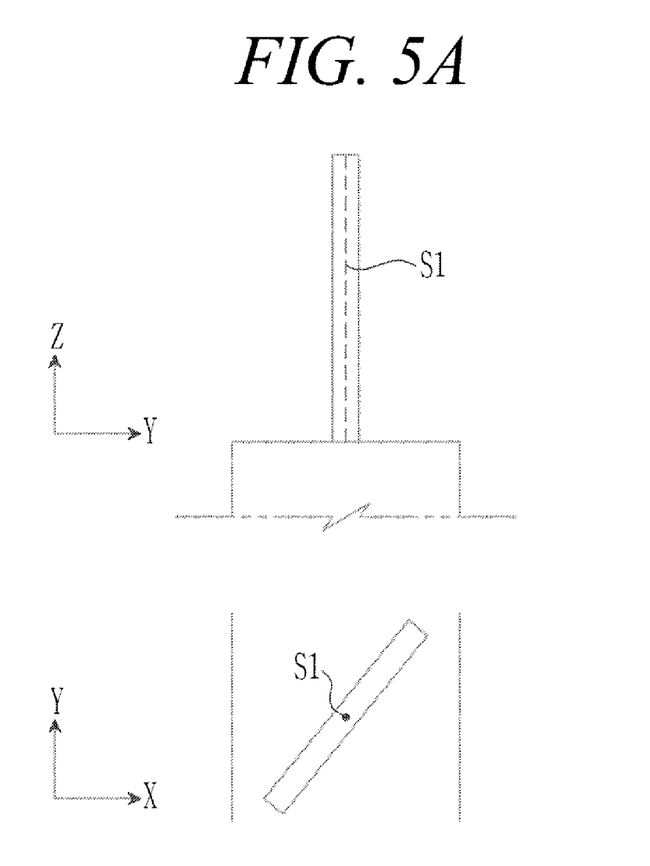
FIG. 5A is an X-axis view and a Y-axis view of a stacking line according to another vane configuration.
Figure 5B:
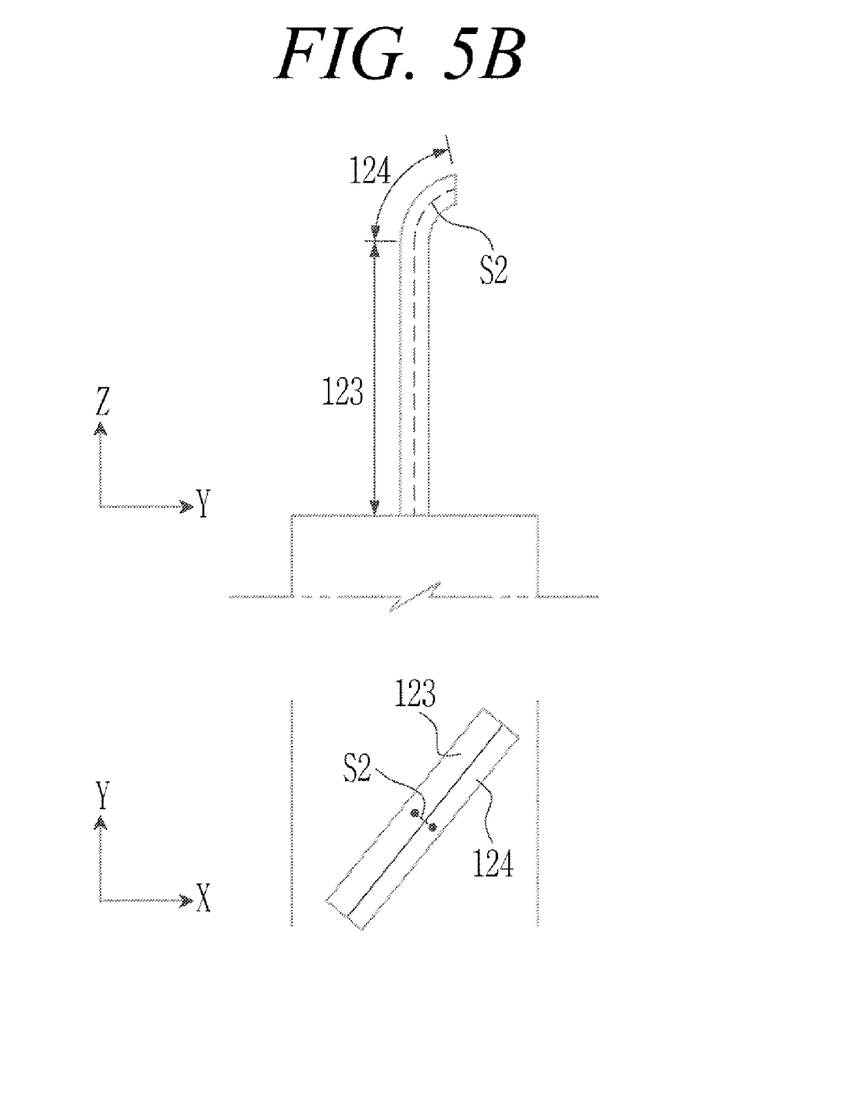
FIG. 5B is an X-axis view and a Y-axis view of a stacking line according to another vane configuration.
Figure 5C:
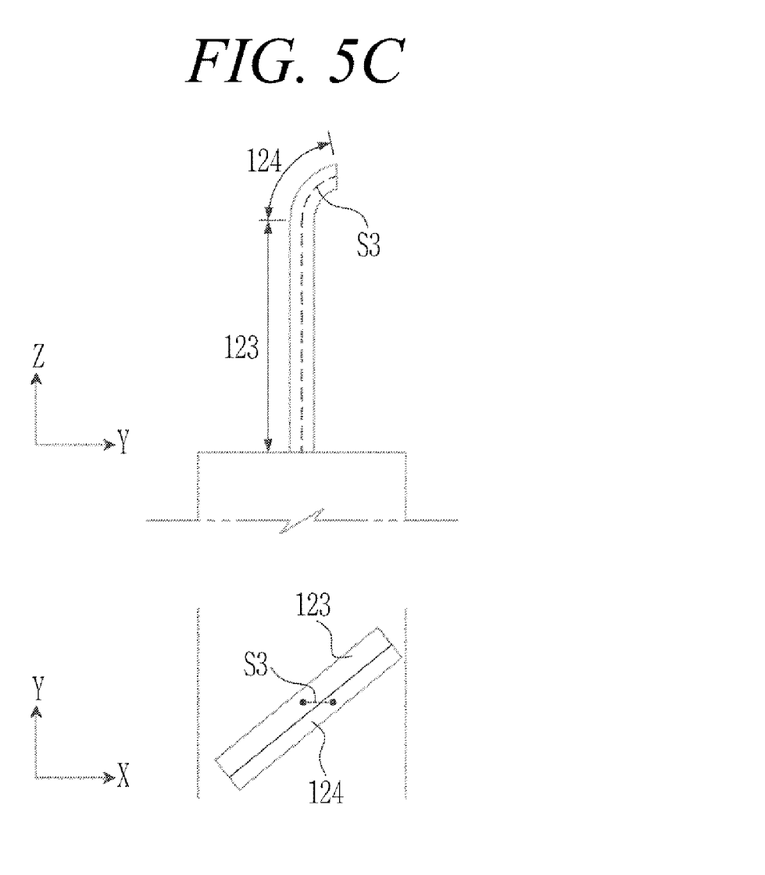
FIG. 5C is an X-axis view and a Y-axis view of a stacking line of the cantilevered vane in accordance with the embodiment of the present disclosure.

FIGS. 5A to 5C compare a stacking line of the cantilevered vane in accordance with an embodiment of the present disclosure (FIG. 5C) and stacking lines of other vane configurations (FIGS. 5A and 5B). The stacking line is a line indicating a gravity axis of the vane and is also referred to as a spanwise axis.

FIG. 5A illustrates a typical type vane, which is a C-shaped vane having no curved part. FIG. 5B illustrates a J-shaped cantilevered vane having a curved part, disclosed in Korean Patent Application No. 10-2017-0077731, filed by the applicant of the present disclosure. FIG. 5C illustrates a modified J-shaped cantilevered vane in accordance with the embodiment of the present disclosure.

Each of FIGS. 5A to 5C includes an upper view in the X-axis direction and a lower view in the Z-axis direction.

The views of FIG. 5A show a vane having a stacking line S1 that is a straight line in the Z-axis direction. The views of FIG. 5B show a vane having a stacking line S2, which follows a straight line in the Z-axis direction throughout a linear part 123 and follows a curved line in the Y-axis direction throughout a curved part 124. Thus, the curved part 124 includes a bend beginning from one end of the linear part 123 and curving in the Y-axis direction.

Meanwhile, the views of FIG. 5C show a vane having a stacking line S3 of the vane shown in FIG. 5C, which similarly follows a straight line in the Z-axis direction throughout the linear part 123 and follows a curved line in the Y-axis direction throughout the curved part 124. In the embodiment of the cantilevered vane 100 shown in FIG. 5C, since, overall, the linear part 123 and the curved part 124 are biased in the X-axis direction, and specifically in the rotating shaft direction, the stacking line S3 is also biased in the X-axis direction.

As such, the cantilevered vane in accordance with the embodiment of the present disclosure is formed to have a J-shaped profile with respect to the X-axis, thus having effects of reducing rubbing of the airfoil and enhancing the vibration stability of the vane hub, and is formed to have a C-shaped profile with respect to the Y-axis, thus having an effect of enhancing the fluidity of fluid flowing around the vane.

Figure 6:
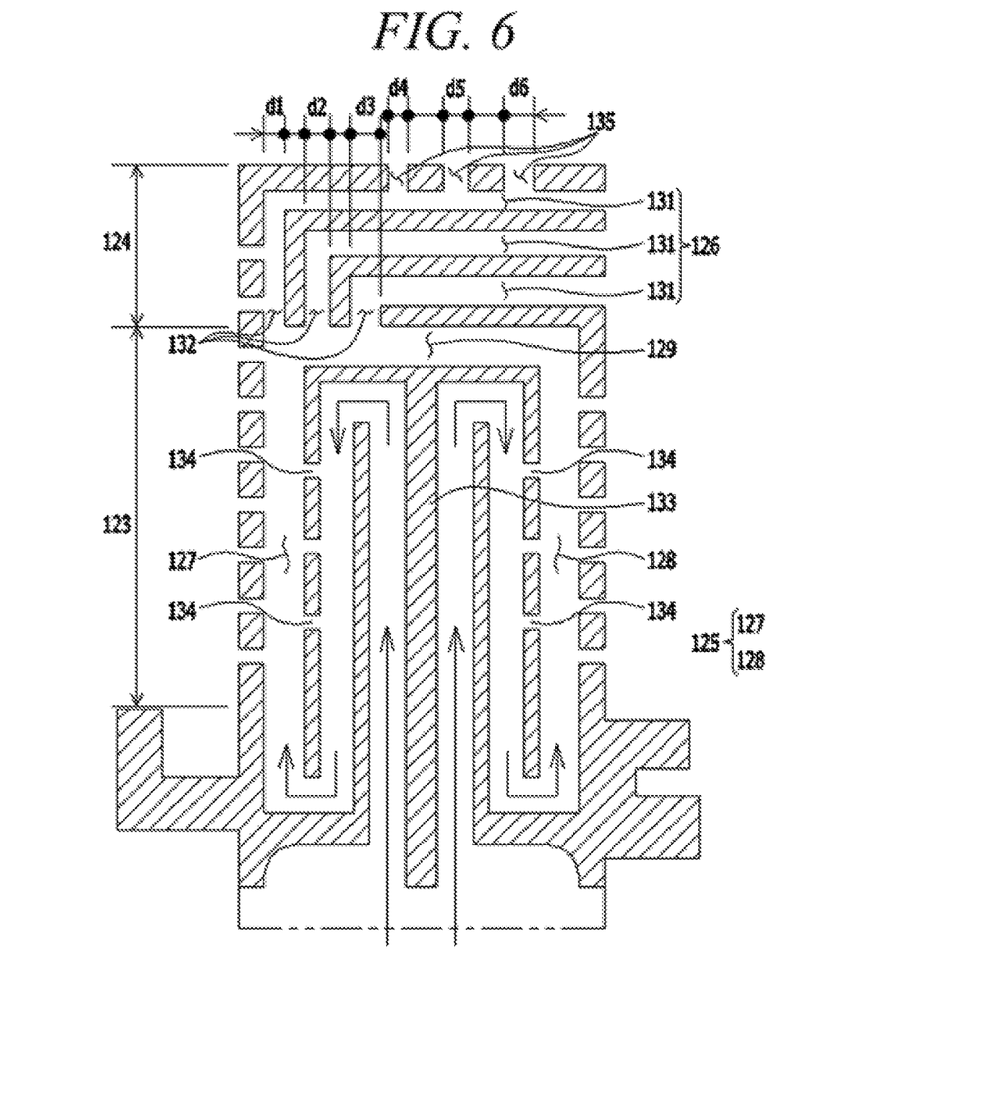
FIG. 6 is a sectional diagram of the cantilevered vane in accordance with an embodiment of the present disclosure.
Figure 7:
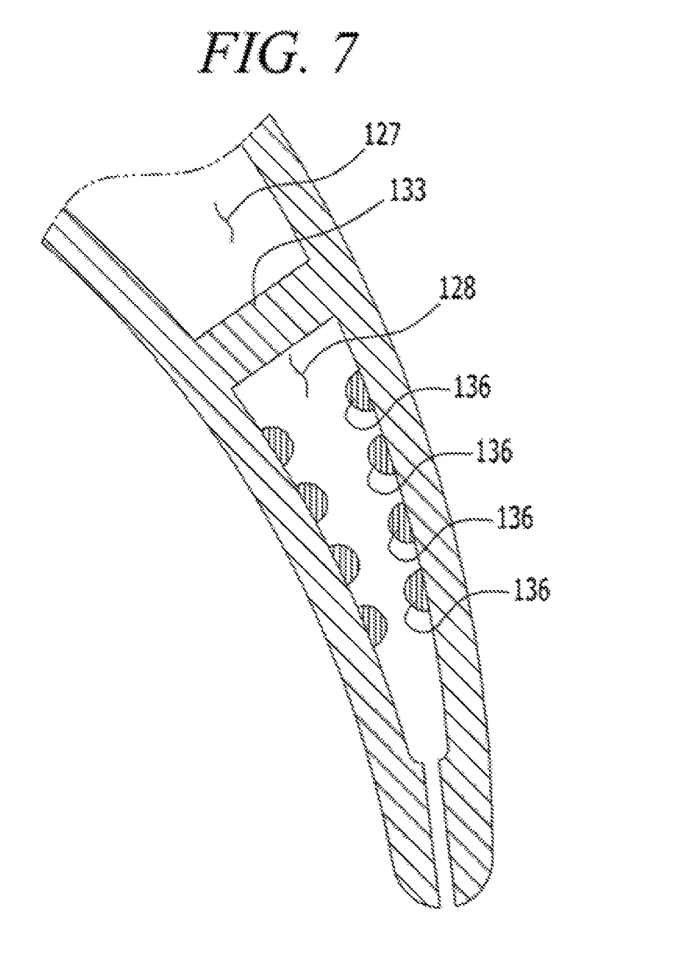
FIG. 7 is a cross-section of a portion of the cantilevered vane of FIG. 6.

FIGS. 6 and 7 illustrate an internal structure of the cantilevered vane in accordance with an embodiment of the present disclosure.

Referring to FIG. 6, a first passage 125 may be formed in the linear part 123 according to the embodiment of the present disclosure so that cooling fluid may flow through the first passage 125. Here, the first passage 125 may be formed of a front airfoil passage 127 and a rear airfoil passage 128. Furthermore, a second passage 126 may be formed in the curved part 124 so that cooling fluid flows through the second passage 126.

In detail, the first passage 125 may include the front airfoil passage 127 for guiding the flow of cooling fluid toward the front airfoil part 121 of the airfoil 120, and the rear airfoil passage 128 for guiding the flow of cooling fluid toward the rear airfoil part 122 of the airfoil 120. In this case, the first passage 125 may include a discharge connection passage 129 such that cooling fluid drawn through the front airfoil passage 127 is discharged through the second passage 126 and the rear airfoil passage 128. It is preferable that the discharge connection passage 129 communicate with the front airfoil passage 127 and that the rear airfoil passage 128 and the second passage 126 communicate with each other.

The second passage 126 may include a plurality of cooling passages 131 extending in a rear airfoil direction of the airfoil 120.

Furthermore, two or more discharge connection holes 132 may be formed between the first passage 125 and the second passage 126 so that some of the cooling fluid flowing through the first passage 125 flows through the second passage 126. Here, the two or more discharge connection holes 132 are formed such that their inner diameters (d1, d2, d3) gradually increase along a flow direction of cooling fluid, so that the flow rate of the cooling fluid may be controlled to remain constant.

As shown in FIG. 6, the cantilevered vane 100 in accordance with the embodiment of the present disclosure may further include a channel partition 133 configured to guide the flow of cooling fluid. The channel partition 133 may guide cooling fluid such that the cooling fluid drawn from a lower end of each of the front and rear airfoil passages 127 and 128 respectively flows in a series of opposing directions, to include a path along which the cooling fluid moves upward, thereafter moves downwards, and then moves upward again.

In some cases, two or more bypass through holes 134 may be formed in the channel partition 133 and positioned toward each of the front airfoil part 121 and the rear airfoil part 122.

Furthermore, two or more discharge holes 135 communicating with the second passage 126 may be formed in one end (i.e., the trailing edge) of the airfoil 120 such that some of the cooling fluid flowing through the second passage 126 may be discharged in a direction of the one end of the airfoil 120. Here, the two or more discharge holes 135 are formed such that their inner diameters (d1, d2, d3) gradually increase in a direction toward the rear airfoil part 122 of the airfoil 120, so that the flow rate of cooling fluid may be controlled to remain constant.

In some cases, as shown in FIG. 7, a plurality of protrusion structures 136 protruding to a predetermined height may be formed in the rear airfoil passage 128 such that turbulence may be created in the flow of cooling fluid.

The cantilevered vane in accordance with an embodiment of the present disclosure has a J-shaped profile with respect to the X-axis, thus having effects of reducing rubbing of the airfoil and enhancing the vibration stability of the vane hub. In addition, the cantilevered vane has a C-shaped profile with respect to the Y-axis, thus having an effect of enhancing the fluidity of fluid flowing around the vane.

Since the rounded structure having a specific shape is formed at the junction between the root attachment and the airfoil, the present disclosure may provide a cantilevered vane having a stable structure.

Since the airfoil includes the linear part and the curved part in which the first passage and the second passage having specific structures are formed, the present disclosure may provide a cantilevered vane capable of markedly enhancing the cooling performance of the airfoil.

Since the first passage includes the front airfoil passage and the rear airfoil passage having specific structures, the present disclosure may provide a cantilevered vane capable of markedly enhancing the cooling performance of the airfoil.

Since the discharge connection holes and the discharge holes are formed such that their inner diameters change depending on hole position to induce discharge rates of cooling fluid that are similar to each other, the present disclosure may provide a cantilevered vane capable of markedly enhancing the cooling performance of the airfoil.

Since the plurality of protrusion structures protruding to a predetermined height are formed in the second passages so that turbulence may be created in the flow of cooling fluid, the present disclosure may provide a cantilevered vane capable of markedly enhancing the cooling performance of the airfoil.

Moreover, the present disclosure may provide a gas turbine including the cantilevered vane 100 according to the present disclosure. Therefore, the gas turbine in accordance with the present disclosure includes the cantilevered vane having a specific structure, whereby the present disclosure may provide a gas turbine including a structure capable of promoting the vibration stability of the vane hub.

The present disclosure is not limited to the specific embodiments described above, and it will be apparent to those skilled in the art that various modifications are possible without departing from the spirit and scope of the invention as defined in the appended claims.

What is claimed is:

1. A cantilevered vane configuration with respect to a gas turbine including a rotating shaft and a casing, the cantilevered vane configuration comprising:
   a root attachment inserted into a slot formed in an inner circumferential surface of a casing of the gas turbine; and
   an airfoil vertically extending from the root attachment to a predetermined height, the airfoil including:
      a linear part extending in a radial direction of the rotating shaft from the inner circumferential surface of the casing toward the rotating shaft of the gas turbine, and
      a curved part integrally formed with the linear part, the curved part including a bend beginning from one end of the linear part and curving in a circumferential direction of the rotating shaft,
      wherein the linear part and the curved part are biased in an axial direction of the rotating shaft.

2. The cantilevered vane configuration according to claim 1, further comprising a rounded structure formed at a junction between the root attachment and the airfoil.

3. The cantilevered vane configuration according to claim 2, wherein the rounded structure has a curvature radius corresponding to a length ranging from 10% to 35% of a width of the root attachment.

4. The cantilevered vane configuration according to claim 1,
   wherein the linear part has a first vertical height with respect to the casing, and
   wherein the curved part has a second vertical height with respect to the first vertical height, the second vertical height corresponding to a length ranging from 20% to 30% of the first vertical height.

5. The cantilevered vane configuration according to claim 1,
   wherein the linear part includes a first passage, and the curved part includes a second passage, and
   wherein the first and second passages are respectively configured to enable a flow of cooling fluid that may be introduced via the root attachment.

6. The cantilevered vane configuration according to claim 5, wherein:
   the airfoil includes a front airfoil part and a rear airfoil part; and
   the first passage includes:
      a front airfoil passage for guiding a flow of cooling fluid toward the front airfoil part,
      a rear airfoil passage for guiding a flow of cooling fluid toward the rear airfoil part, and
      a discharge connection passage communicating with the front airfoil passage, the discharge connection passage configured to discharge cooling fluid through the second passage and the rear airfoil passage.

7. The cantilevered vane configuration according to claim 5, wherein:
   the second passage includes a plurality of cooling passages extending toward a rear airfoil direction of the airfoil; and
   the first passage and the second passage communicate with each other via at least two discharge connection holes through which cooling fluid in the first passage may flow to the second passage.

8. The cantilevered vane configuration according to claim 7,
   wherein the at least two discharge connection holes are spaced apart from each other in the axial direction,
   wherein the at least two discharge connection holes include a first discharge connection hole disposed closest to a leading edge of the airfoil and a second discharge connection hole disposed closest to a trailing edge of the airfoil, and
   wherein the at least two discharge connection holes have inner diameters that gradually increase from the first discharge connection hole to the second discharge connection hole.

9. The cantilevered vane configuration according to claim 6, further comprising a channel partition for forming the front and rear airfoil passages and for guiding cooling fluid that may be drawn from a lower end of each of the front airfoil passage and the rear airfoil passage to move the respectively drawn cooling fluid in a series of opposing directions.

10. The cantilevered vane configuration according to claim 9, wherein the channel partition has at least two cooling holes positioned toward each of the front airfoil part and the rear airfoil part.

11. The cantilevered vane configuration according to claim 5, wherein the airfoil has a trailing edge in which at least two discharge holes are formed to communicate with the second passage and to discharge cooling fluid that may flow in the second passage toward the trailing edge.

12. The cantilevered vane configuration according to claim 11, wherein the airfoil includes a front airfoil part and a rear airfoil part, and the at least two discharge holes have inner diameters that gradually increase toward the rear airfoil part.

13. The cantilevered vane configuration according to claim 6, further comprising
a plurality of protrusion structures formed in the rear airfoil passage, each protrusion structure protruding from a first inner wall of the rear airfoil passage by a predetermined height to create turbulence in the flow of cooling fluid that may flow in the rear airfoil passage,
wherein the predetermined height of each protrusion is less than a distance between the first inner wall and a second inner wall facing the first inner wall.

14. The cantilevered vane configuration according to claim 1, wherein the airfoil has a J-type profile including a bend with respect to the axial direction of the rotating shaft and has a C-shaped profile with respect to the circumferential direction of the rotating shaft.

15. A gas turbine comprising a plurality of cantilevered vanes spaced apart from each other on an inner circumferential surface of a casing, each cantilevered vane comprising:
a root attachment configured to be inserted into a slot formed in the inner circumferential surface; and
an airfoil vertically extending from the root attachment to a predetermined height, the airfoil including:
a linear part extending in a radial direction from the inner circumferential surface of the casing toward a rotating shaft of the gas turbine, and
a curved part integrally formed with the linear part, the curved part including a bend beginning from one end of the linear part and curving in a circumferential direction of the rotating shaft,
wherein the linear part and the curved part are biased in the circumferential direction.

16. The gas turbine according to claim 15, wherein the linear part includes a first passage through which cooling fluid flows, and the curved part includes a second passage through which cooling fluid flows.

17. The gas turbine according to claim 16, wherein:
the second passage includes a plurality of cooling passages extending toward a rear airfoil direction of the airfoil; and
the first passage and the second passage communicate with each other via at least two discharge connection holes through which cooling fluid in the first passage flows to the second passage.

18. The gas turbine according to claim 16, wherein the airfoil has a trailing edge in which at least two discharge holes are formed to communicate with the second passage and to discharge cooling fluid that flows in the second passage toward the trailing edge.

19. The gas turbine according to claim 16, wherein:
the airfoil includes a front airfoil part and a rear airfoil part; and
the first passage includes:
a front airfoil passage for guiding a flow of cooling fluid toward the front airfoil part,
a rear airfoil passage for guiding a flow of cooling fluid toward the rear airfoil part, and
a discharge connection passage communicating with the front airfoil passage, the discharge connection passage configured to discharge cooling fluid through the second passage and the rear airfoil passage.

20. The gas turbine according to claim 19, further comprising a channel partition for forming the front and rear airfoil passages and for guiding cooling fluid drawn from a lower end of each of the front airfoil passage and the rear airfoil passage to move the respectively drawn cooling fluid in a series of opposing directions.

* * * * *